(12) United States Patent  
Cohen et al.

(10) Patent No.: US 7,040,220 B1  
(45) Date of Patent: May 9, 2006

(54) JUICE EXTRACTOR APPLIANCE HAVING IMPROVED CUTTER DISC

(75) Inventors: Eli Cohen, Lev HaSharon (IL); Ann Grant, New York, NY (US)

(73) Assignee: AAC Trade Ltd., New York, NY (US)

( * ) Notice: Subject to any disclaimer, the term of this patent is extended or adjusted under 35 U.S.C. 154(b) by 139 days.

(21) Appl. No.: 10/972,424

(22) Filed: Oct. 26, 2004

(51) Int. Cl.
  *A23N 1/00* (2006.01)
  *A23N 1/02* (2006.01)
  *A47J 43/46* (2006.01)
  *A47J 43/07* (2006.01)
  *A23L 1/00* (2006.01)

(52) U.S. Cl. .......................... 99/511; 99/513
(58) Field of Classification Search ............ 99/492, 99/495, 509–513; 366/291, 297–300, 314, 366/601; 241/37.5, 92, 282.1, 282.2; 494/36, 494/37, 43, 47, 10, 85, 64; 426/61, 63, 49, 426/52, 533, 599, 231–233
See application file for complete search history.

(56) References Cited

U.S. PATENT DOCUMENTS

| | | | | |
|---|---|---|---|---|
| 4,297,038 A | * | 10/1981 | Falkenbach | 366/206 |
| 4,350,087 A | * | 9/1982 | Ramirez | 99/511 |
| 4,506,601 A | * | 3/1985 | Ramirez et al. | 99/511 |
| 4,614,153 A | * | 9/1986 | Kurome et al. | 99/511 |
| 4,681,031 A | * | 7/1987 | Austad | 99/511 |
| 4,700,621 A | * | 10/1987 | Elger | 99/511 |
| 6,397,736 B1 | * | 6/2002 | Tseng et al. | 99/511 |
| 6,412,404 B1 | * | 7/2002 | Hsu | 99/495 |
| 6,742,447 B1 | * | 6/2004 | Chen | 99/510 |
| 6,813,997 B1 | * | 11/2004 | Lin | 99/511 |
| 6,862,982 B1 | * | 3/2005 | Wang | 99/511 |

* cited by examiner

Primary Examiner—Timothy F. Simone (57) ABSTRACT

A juice extractor appliance for extracting juice from food articles, includes: a housing having an inlet feed tube for feeding food articles into the appliance, and an outlet for outletting juice extract from the food articles; a pusher rod for manually pushing the food articles through the inlet feed tube; and a cutter disc rotatable about a central disc axis and including a plurality of cutting edges projecting from one side of the disc facing the inlet feed tube for cutting the food articles into a pulp saturated with juice when the food article is pushed against the cutter disc by the pusher rod. The cutter disc includes, on the side thereof facing the inlet feed tube, a projecting pinching surface projecting outwardly of the cutting edges and located eccentrically with respect to the central disc axis such that when only a thin sliver of food article remains between the pusher rod and cutter disc, the projecting pinching surface presses the thin sliver against the pusher rod to effect a slight rotation of the thin sliver with respect to the cutter disc, and thereby to better assure the complete cutting up of the food article into pulp saturated with juice.

19 Claims, 10 Drawing Sheets

JUICE EXTRACTOR APPLIANCE HAVING IMPROVED CUTTER DISC

FIELD AND BACKGROUND OF THE INVENTION

The present invention relates to a juice extractor appliance for extracting juice from various types of food articles. The invention is particularly useful with respect to the type of appliance described in U.S. Pat. Nos. 6,397,736 and 6,742,447, and is therefore described below with respect to such type of appliance.

The above-cited patents describe a juice extractor appliance for extracting juice from food articles, comprising: a housing having an inlet feed tube for feeding food articles into the appliance, and an outlet for outletting juice extract from such food articles; a pusher rod for manually pushing the food articles through the inlet feed tube; and a cutter disc rotatable about a central disc axis and including a plurality of cutting edges projecting from one side of the disc facing the inlet feed tube for cutting the food articles into a pulp saturated with juice when the food article is pushed against the cutter disc by the pusher rod. Such an appliance is hereinafter referred to as "an appliance of the type herein described".

When appliances of the type herein described are used for extracting juice from various types of food articles, such as fruit, vegetables, and the like, the rotation of the cutter disc effectively cuts the food article into a pulp saturated with juice until a thin sliver of the food article remains, which firmly adheres to the cutting edges of the cutter disc and rotates with the cutter disc. When this occurs, it is usually necessary, after each use of the appliance, to remove the cutter disc and to clean away the thin sliver of food article remaining on the cutter disc.

OBJECTS AND BRIEF SUMMARY OF THE INVENTION

An object of the present invention is to provide an appliance of the type herein described having advantages in the above respect.

According to one aspect of the present invention, there is provided an appliance of the type herein described wherein the cutter disc includes, on the side thereof facing the inlet feed tube, a projecting pinching surface projecting outwardly of the cutting edges and located eccentrically with respect to the central disc axis such that when only a thin sliver of food article remains between the pusher rod and cutter disc, the projecting pinching surface presses the thin sliver against the pusher rod to effect a slight rotation of the thin sliver with respect to the cutter disc, and thereby to better assure the complete cutting up of the food article into pulp saturated with juice.

An appliance constructed in accordance with the foregoing feature thus effectively cuts up the food article completely, without leaving the thin sliver adherent to the cutter disc. This not only increases the juice yield, but also provides the probably more important advantage of reducing or eliminating the need for cleaning the cutter disc after each use of the appliance.

Several embodiments of the invention are described below for purposes of example. In one embodiment, the projecting pinching surface is in the form of a dimple formed in the side of the cutter disc opposite to that facing the inlet feed tube at the eccentric location such as to produce the projecting pinching surface on the side of the cutter disc facing the inlet feed tube. In another described embodiment, the projecting pinching surface is in the form of a projection formed in the side of the cutter disc facing the inlet feed tube at the eccentric location. The cutter disc could include a plurality of such projecting pinching surfaces located eccentrically with respect to the central disc axis.

According to another aspect of the present invention, there is provided an appliance of the type herein described wherein the applicator further comprises a separator within the housing for separating the juice from the pulp and for directing the juice via an outlet tube to the outlet; and wherein the outlet includes a spout movably mounted with respect to the outlet tube to a non-blocking position permitting the flow of juice to the spout, or to a blocking position blocking the flow of juice to the spout.

According to a still further aspect of the present invention, there is provided an appliance of the type herein described wherein the appliance further comprises a lateral extension extending laterally of the housing for receiving a receptacle to collect the pulp after the juice has been separated therefrom; the lateral extension including a sensor for sensing a receptacle thereon and effective to enable rotation of the cutter disc when a receptacle is sensed on the lateral extension.

Further features and advantages of the invention will be apparent from the description below.

BRIEF DESCRIPTION OF THE DRAWINGS

The invention is herein described, by way of example only, with reference to the accompanying drawings, wherein.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DESCRIPTION OF A PREFERRED EMBODIMENT

The appliance illustrated in the drawings includes a housing constituted of a lower base 2, an upper base 3, and a top cover 4. A locking bar 5 is pivotally mounted to the lower base 2 and is engageable with the cover 4 for selectively locking the cover in place, or unlocking it to enable access into the interior of the housing.

Figure 6:
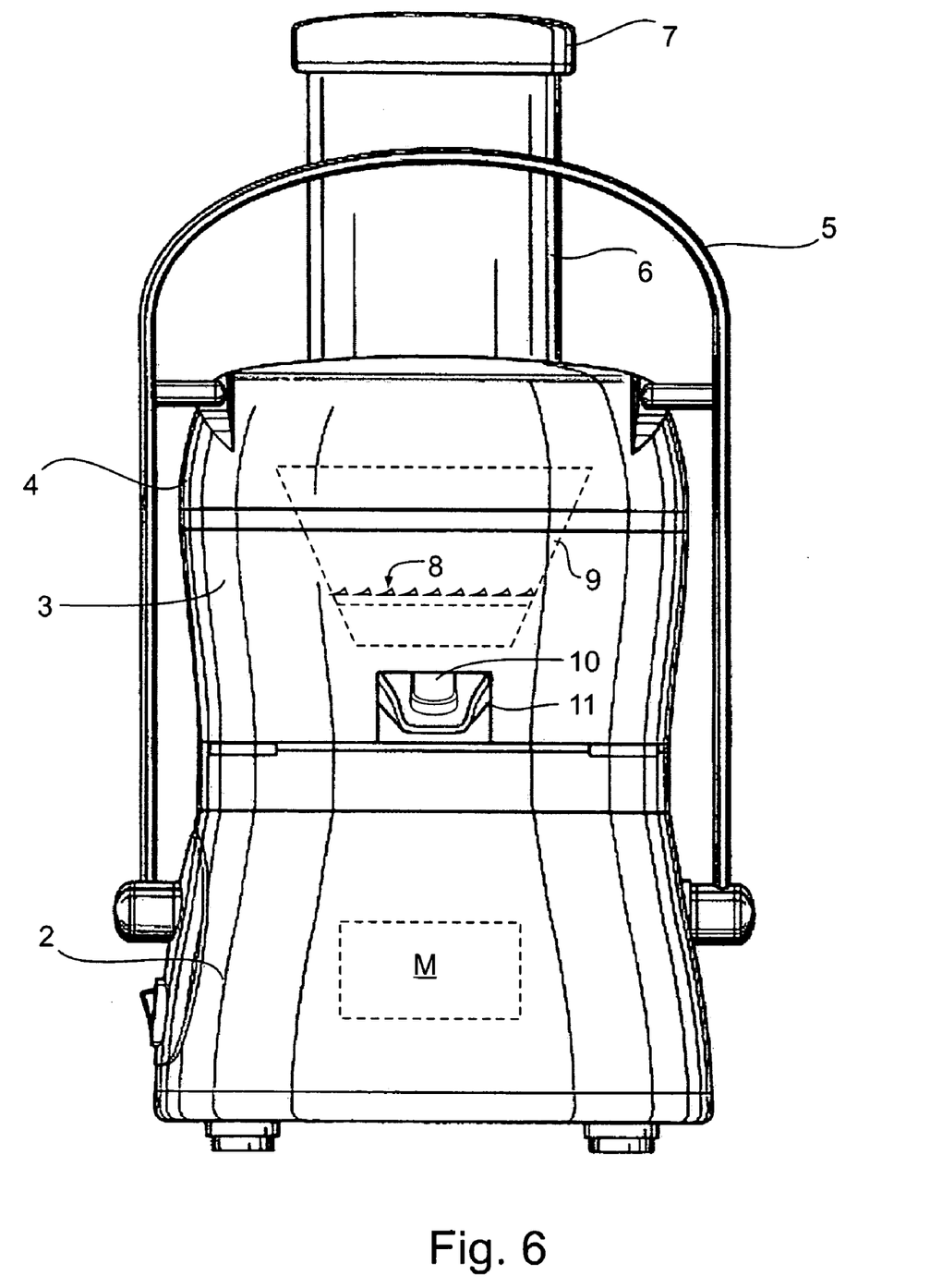
FIG. 6 is a front elevational view of the appliance of FIG. 1 showing, in broken lines, the cutter disc for cutting the food articles into a pulp saturated with juice, and the strainer basket for separating the juice from the pulp.

Cover 4 includes an inlet feed tube 6 for introducing food articles into the housing, and a pusher member or rod 7 for manually pushing the food articles into the housing. As shown in FIG. 6, a cutter disc 8 is rotatably mounted within the housing and is driven by an electrical motor M for cutting the food articles received through the feed tube 6 into a pulp saturated with the juice to be extracted. As further shown in FIG. 6, the housing further includes a strainer basket 9 which separates the juice from the pulp and directs the juice to an outlet tube 10 overlying a spout 11, for outletting the extracted juice into a receptacle (not shown) to be placed under the spout. Base 2 and cover 4 further include lateral extensions, 12 and 14, respectively, for removably supporting another receptacle 15 to receive the pulp in the strainer basket 8 after extraction of the juice therefrom.

Insofar as described above, such appliances are well known and further details are available from commercially-available articles and/or from the above-identified U.S. patents.

As indicated above, one of the drawbacks in the known juice extractor appliances of this type is the need for frequent cleaning of the cutter disc 8 because of the presence of a thin sliver of the food article remaining adherent to the cutter disc after each use of the appliance. Thus, as the food article introduced via the inlet feed tube 6 is pressed by pusher rod 7 into engagement with the cutter disc 8, the food article is restrained against rotation with the cutter disc by the pusher rod so that the cutter disc effectively cuts up the food article into a pulp saturated with the juice. However, when but a thin sliver of the food article remains, the pressure applied by the pusher rod pressing the food article against the cutter disc is insufficient to prevent rotation of the remnant thin sliver with the cutter disc, so that the thin sliver remains attached to and rotates with the cutter disc. This not reduces the amount of juice capable of being extracted from the food article, but more importantly, increases the need for frequent cleaning of the cutter disc after each use of the appliance.

The present invention provides an improved cutter disc construction which reduces of eliminates this problem. The invention also provides several other important improvements to juice extractor appliances of this type.

The improvement regarding the construction of the cutter disc for eliminating the thin sliver of the food article remaining on the cutter disc will first be described particularly with reference to FIGS. 6–12.

Figure 7:
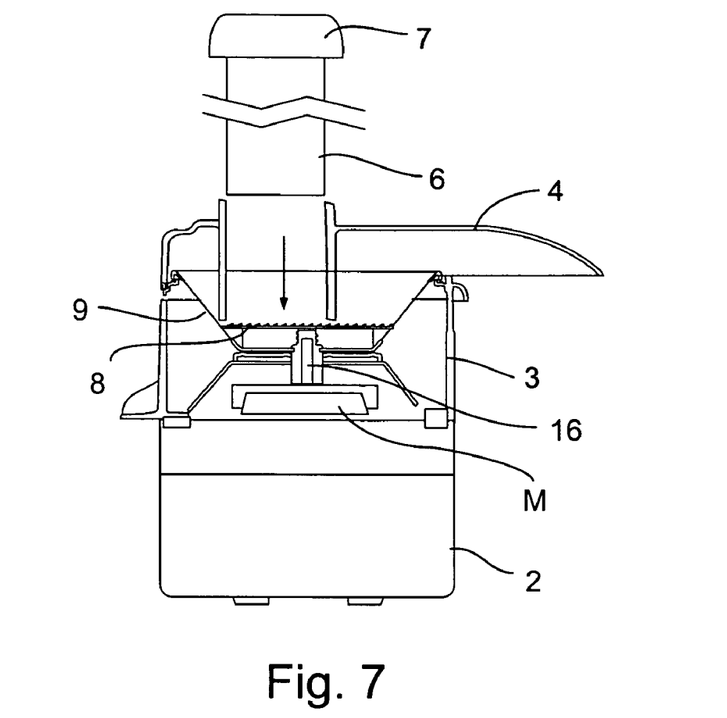
FIGS. 7 and 8 diagrammatically illustrate the location of the cutter disc with respect to the inlet feed tube.
Figure 8:
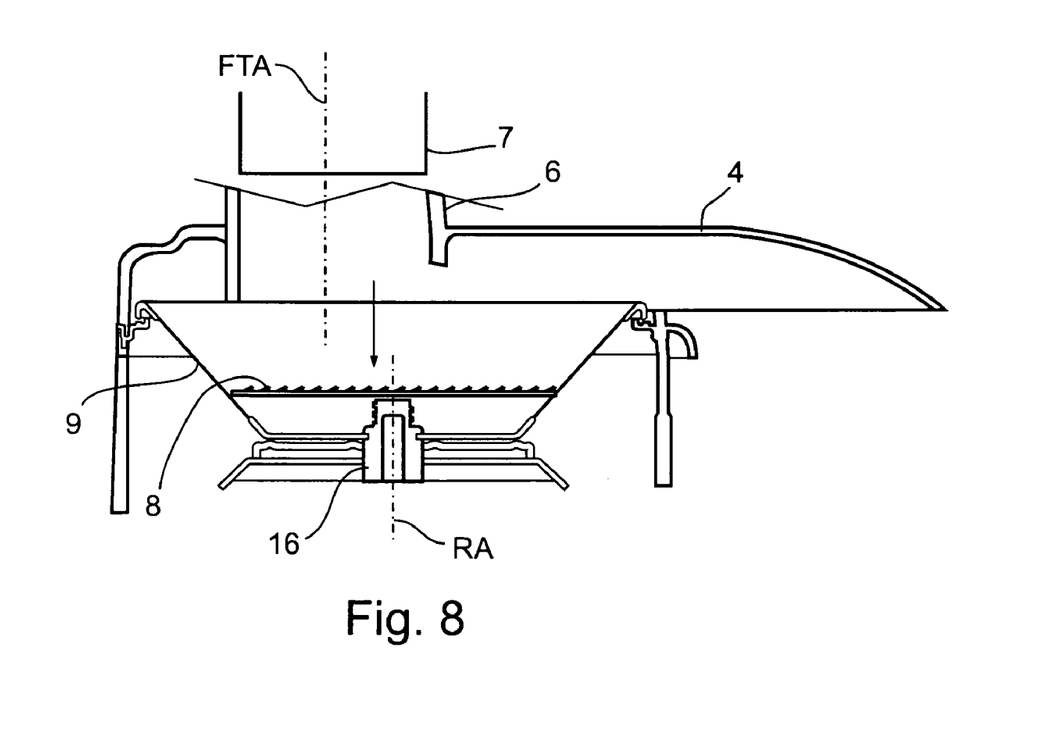

As shown particularly in FIGS. 7 and 8, the cutter disc 8 is eccentrically mounted with respect to the feed tube 6. That is, the cutter disc 8 is driven by motor M via a drive shaft 16 about a rotary axis RA which is laterally displaced from the axis FTA of the feed tube 6. Such eccentric mounting of the cutter disc is frequently used in juice extractor appliances of this type to avoid the problem of the "dead region" of the food article centrally of the cutter disc. Such "dead region" of the food article may not be cut up by the cutter disc if the rotary axis of the cutter disc is coaxial with the axis of the feed tube. However, an eccentric mounting of the cutter disc with respect to the feed tube is not essential in the present case, when using the cutter discs illustrated in FIGS. 9–12, since such cutter discs are provided with cutting edges in the center area to avoid this "dead region" problem.

Figure 9:
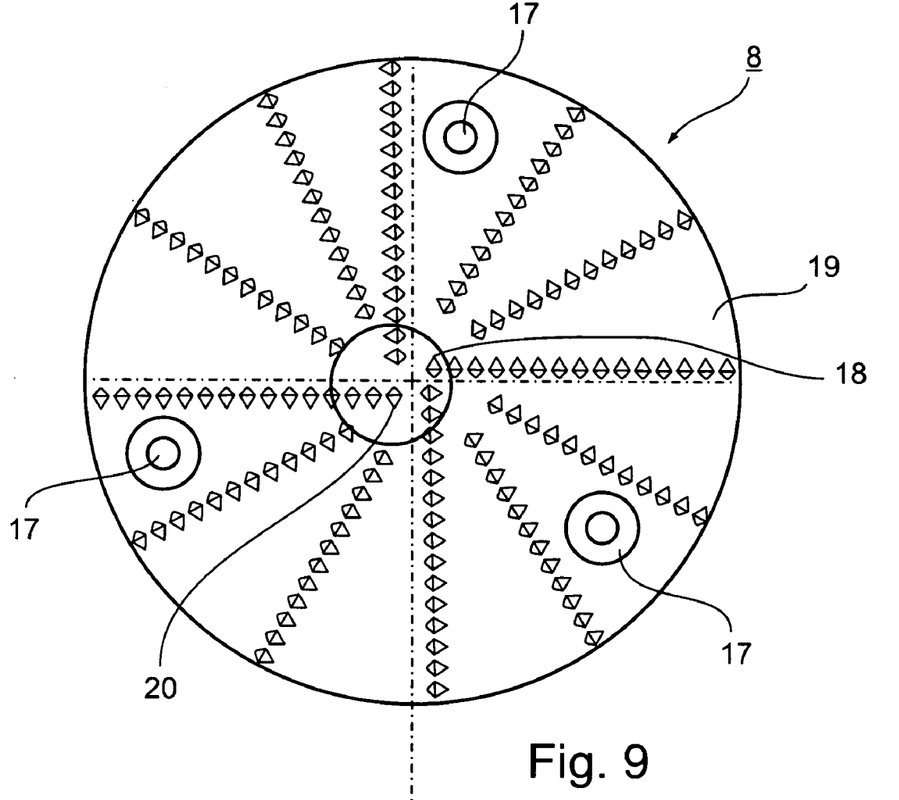
FIGS. 9 and 10 are plan and side views, respectively, of the cutter disc in the appliance of FIGS. 1–8.

Thus, FIG. 9 illustrates cutter disc 8 as including a plurality of cutting edges projecting from the side of the cutter disc facing the inlet feed tube 6 for cutting the food articles into a pulp saturated with juice when the food article is pushed against the cutter disc by the pusher rod 7. The cutter disc is mounted to shaft 16 via a plurality of fasteners received within openings 17 formed in the cutter disc.

Figure 10:
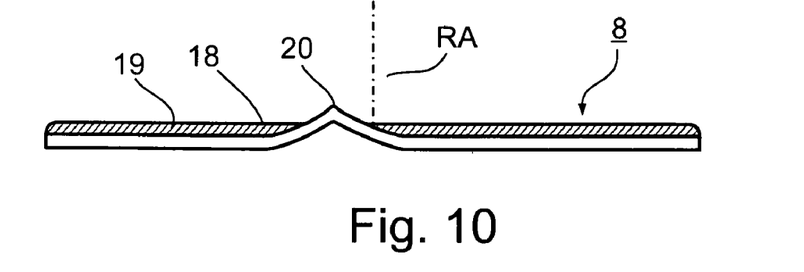

FIGS. 9 and 10 illustrate the rotary axis RA as passing through the center of the cutter disc. As shown particularly in FIG. 9, the cutting edges formed in the face of the cutter disc 8 include a first group located in a central circular region 18, and a second group located in an outer peripheral region 19 around the central circular region 18. As will also be seen from FIG. 9, the central circular region 18 of the cutter disc is eccentric with respect to the rotary axis RA of the cutter disc.

As further seen in FIG. 9, the second group of cutting edges, namely those formed in the outer peripheral region 19 of the cutter disc, are located in a plurality of lines radiating from the center circular region 18. The first group of cutting edges, namely those formed in the center circular region 18, are in the form of extensions of two pairs of such lines which intersect within the central circular region 18. It will be seen from FIG. 9 that the cutting edges in the central circular region 18 are of substantially the same size and shape as those in the outer peripheral region 19.

In accordance with one aspect of the present invention, the side of cutter disc 8 facing the inlet feed tube 6 is formed with a projecting pinching surface, best seen at 20 in FIG. 10 (and also in FIG. 9) projecting outwardly of the cutting edges and located eccentrically with respect to the center disc axis, i.e., the rotary axis RA, of the cutter disc. Thus, when a food article is pressed by the pusher rod 7 into firm engagement with the cutter disc, its cutting edges will cut the food article into a pulp saturated with the juice; and when the food article is reduced to a thin sliver which would normally adhere to the cutting disc by the cutting edges, the projecting pinching surface 20 of the cutter disc will "pinch" the thin sliver between it and the pusher rod, i.e., will press the sliver against the pusher rod, to effect a slight rotation of the thin sliver with respect to the cutter disc sufficient to detach the thin sliver from the cutter disc so as not to rotate with it. Thus, the rotation of the cutter disc will also cut up this thin sliver to thereby complete the cutting up of the food article without leaving a sliver remnant on the cutter disc.

In cutter disc 8 illustrated in FIGS. 9 and 10, the projecting pinching surface 20 is in the form of a dimple formed in the side of the cutter disc opposite to that facing the inlet feed tube 6 at an eccentric location with respect to the rotary axis RA of the cutter disc. As shown in FIG. 10, the so-formed dimple produces the pinching surface 20 which projects outwardly of the cutting edges of the cutting cutter disc, to thereby effect the above-described "pinching" of the food article when but a thin sliver remains.

Figure 11:
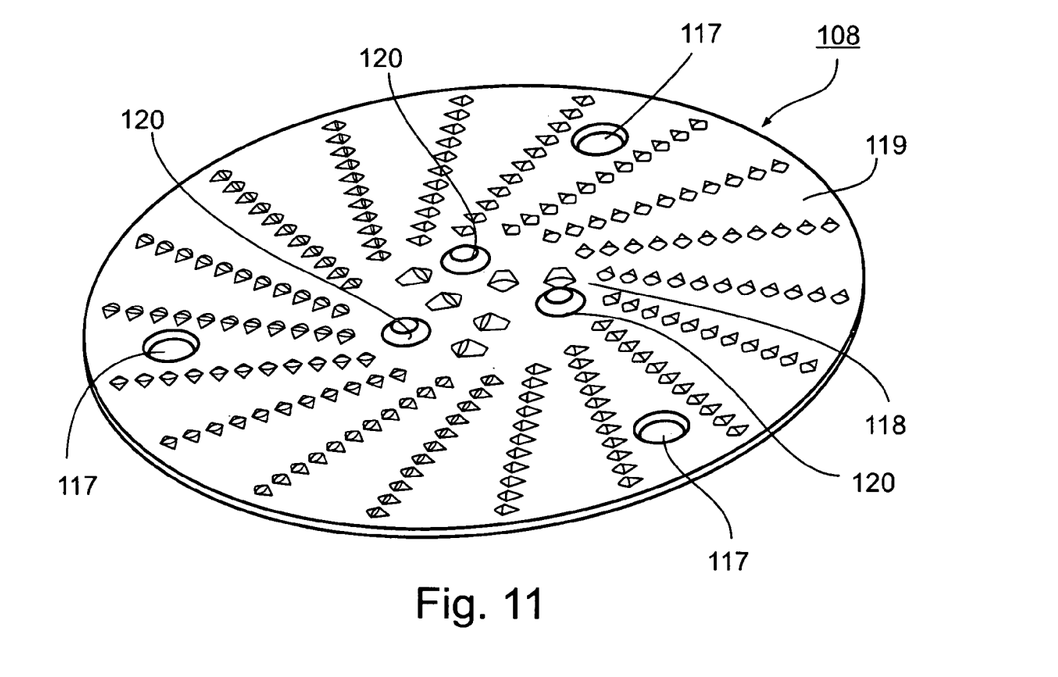
FIGS. 11 and 12 are perspective and side views, respectively, illustrating another construction of cutter disc which may be used.
Figure 12:
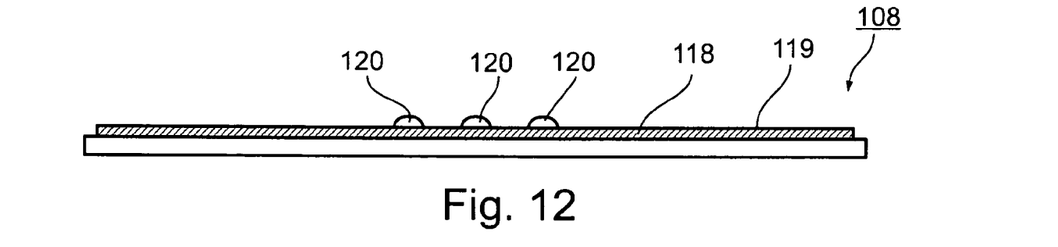

FIGS. 11 and 12 illustrate a variation in the construction of the cutter disc, therein designated 108. Cutter disc 108 is also formed with openings 117 for mounting it to the motor drive shaft (motor 16, FIGS. 7, 8), and with cutting edges constituted of a first group located in a central circular region 118, and a second group located in the outer peripheral region 119 of the cutter disc around the central circular region.

The cutter disc illustrated in FIGS. 11 and 12 is also formed, on the side thereof facing the inlet feed tube 6, with a projecting pinching surface, therein designated 130, projecting outwardly of the cutting edges and located eccentrically with respect to the central disc axis, i.e., rotary axis RA, of the cutting disc. In this case, however, the pinching surface 120 is in the form of a rounded or semi-spherical projection, which may be flattened at its outer face as shown at 121, formed in the side of the cutter disc 108 facing the inlet feed tube. In this manner pinching surface 120 in the cutter disc of FIGS. 11 and 12 will thus act, in the same manner as described above with respect to pinching surface 20 in the cutter disc of FIGS. 9 and 10, to pinch free the thin sliver of food normally formed and adherent to the cutter disc.

In the cutter disc illustrated in FIGS. 11 and 12, the cutting edges formed in the outer peripheral region 119 are also located in a plurality of lines radiating from the central circular region 118. However, the cutting edges in the central circular region 118 are of larger size than those in the outer peripheral region 119. In addition, the cutting edges within the central circular region 118 are constituted of but six cutting edges divided into three pairs, each pair being located in a line radiating from the center of the central circular region 118.

In addition, although the cutter disc 8 illustrated in FIGS. 9 and 10 includes but a single projecting pinching surface 20, cutter disc 108 in FIGS. 11 and 12 includes three such projecting pinching surfaces 120 located symmetrically around the central circular region 118. It will be appreciated that the cutter disc of FIGS. 9 and 10 could also be provided with a plurality of such projecting pinching surfaces, e.g., as in FIGS. 11 and 12.

Figure 1:
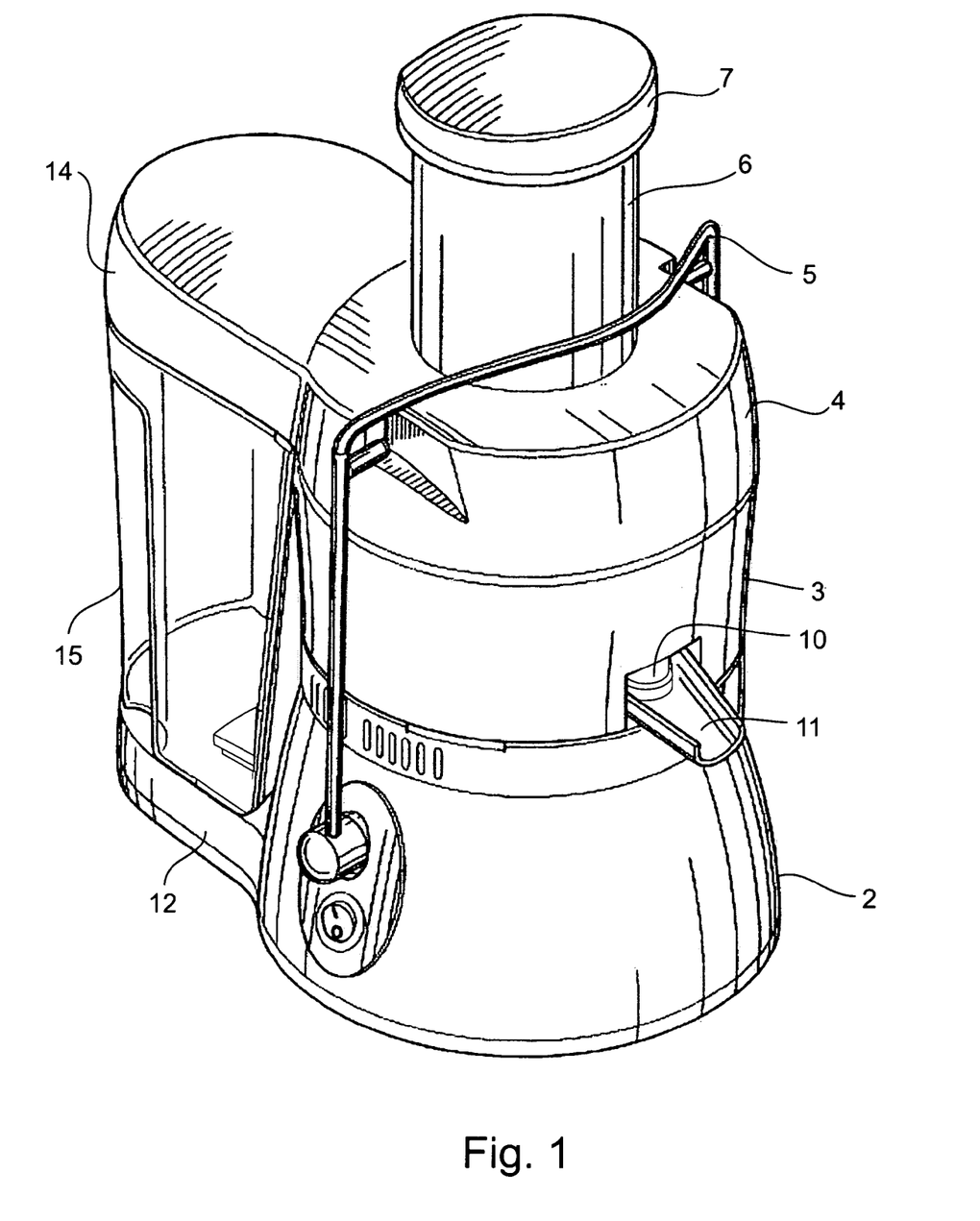
FIG. 1 is a front perspective view illustrating one form of juice extractor appliance constructed in accordance with the present invention.
Figure 2:
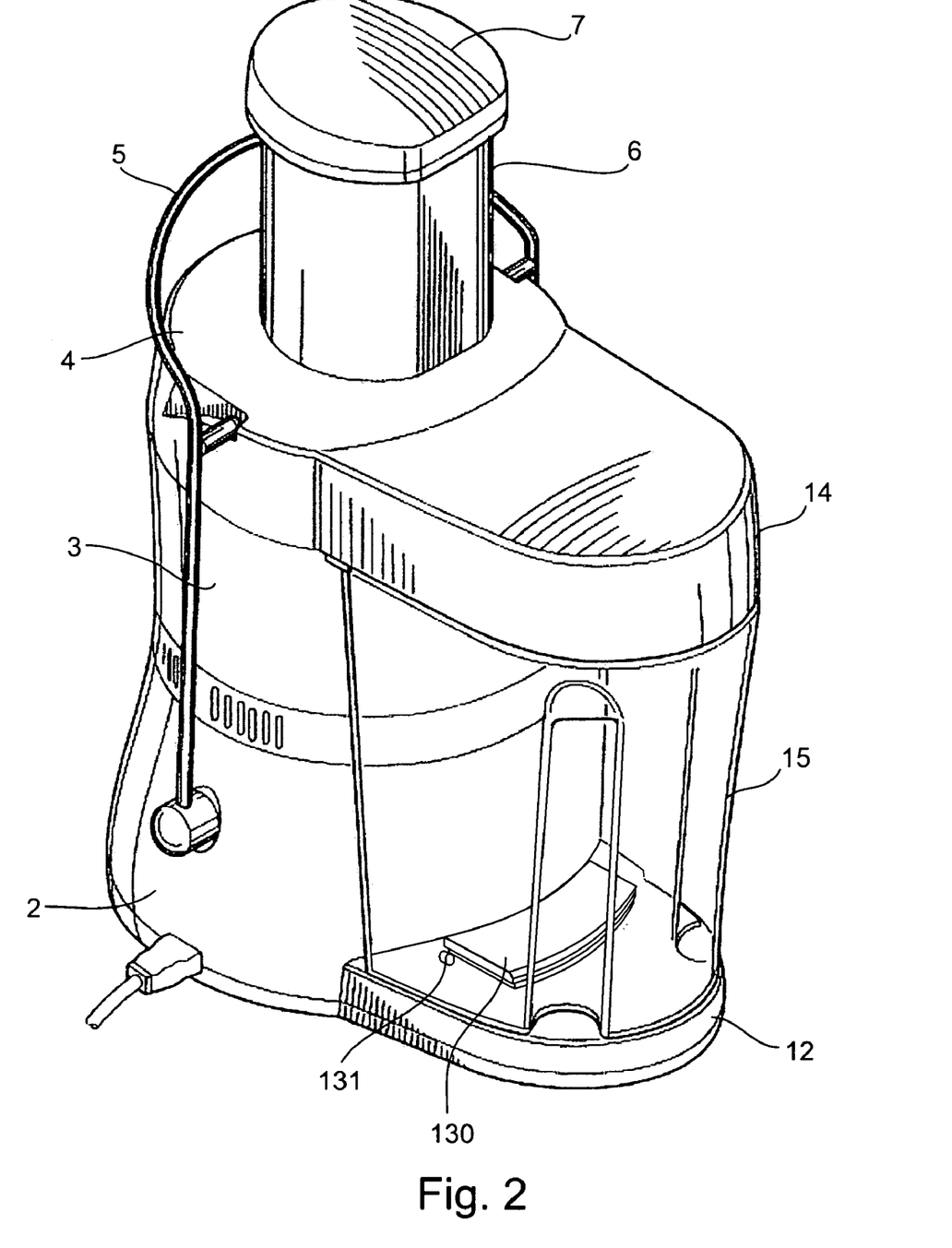
FIG. 2 is a rear perspective view of the appliance of FIG. 1.
Figure 3:
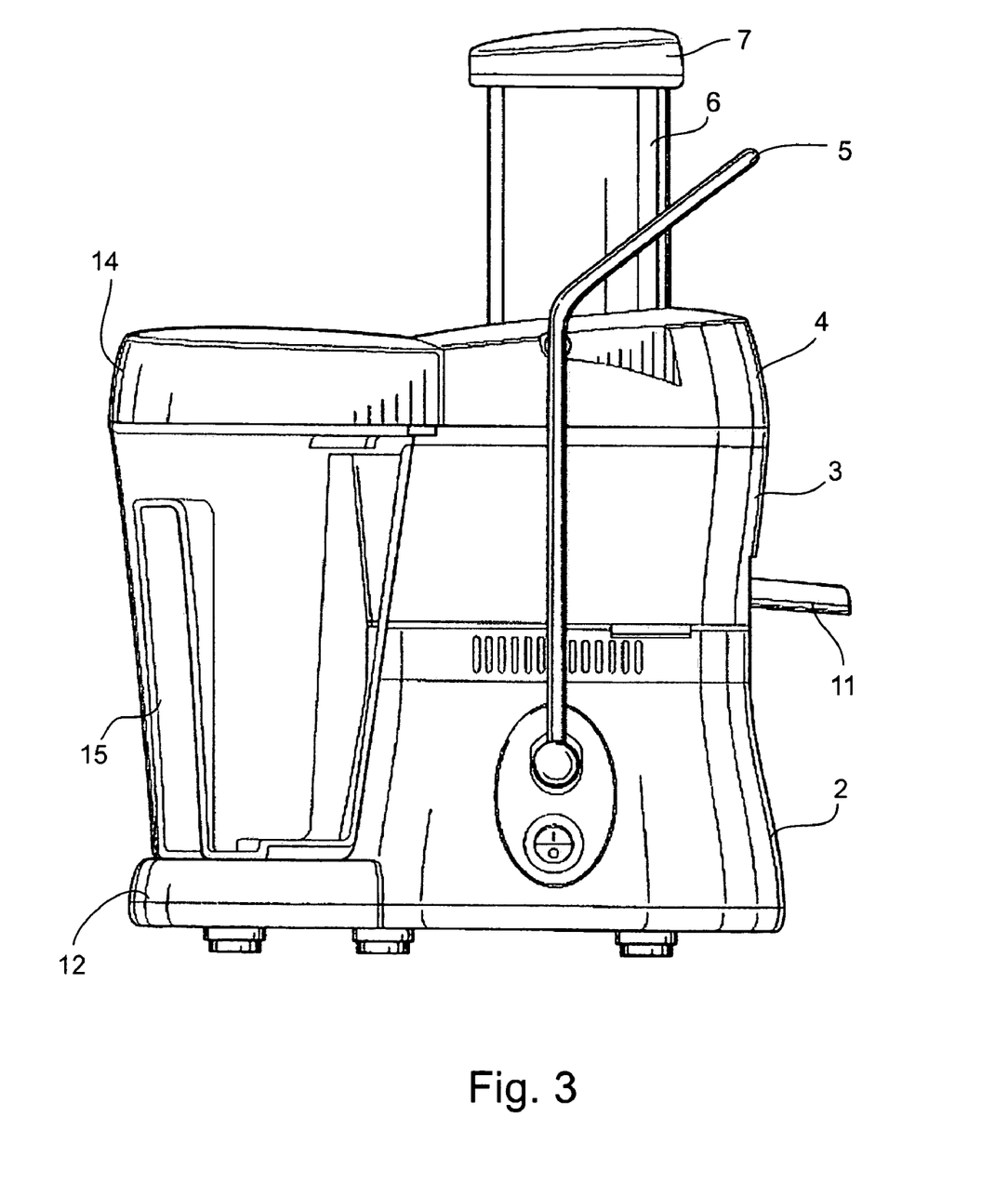
FIGS. 3 and 4 are side elevational views from the opposite sides of the appliance of FIG. 1.
Figure 4:
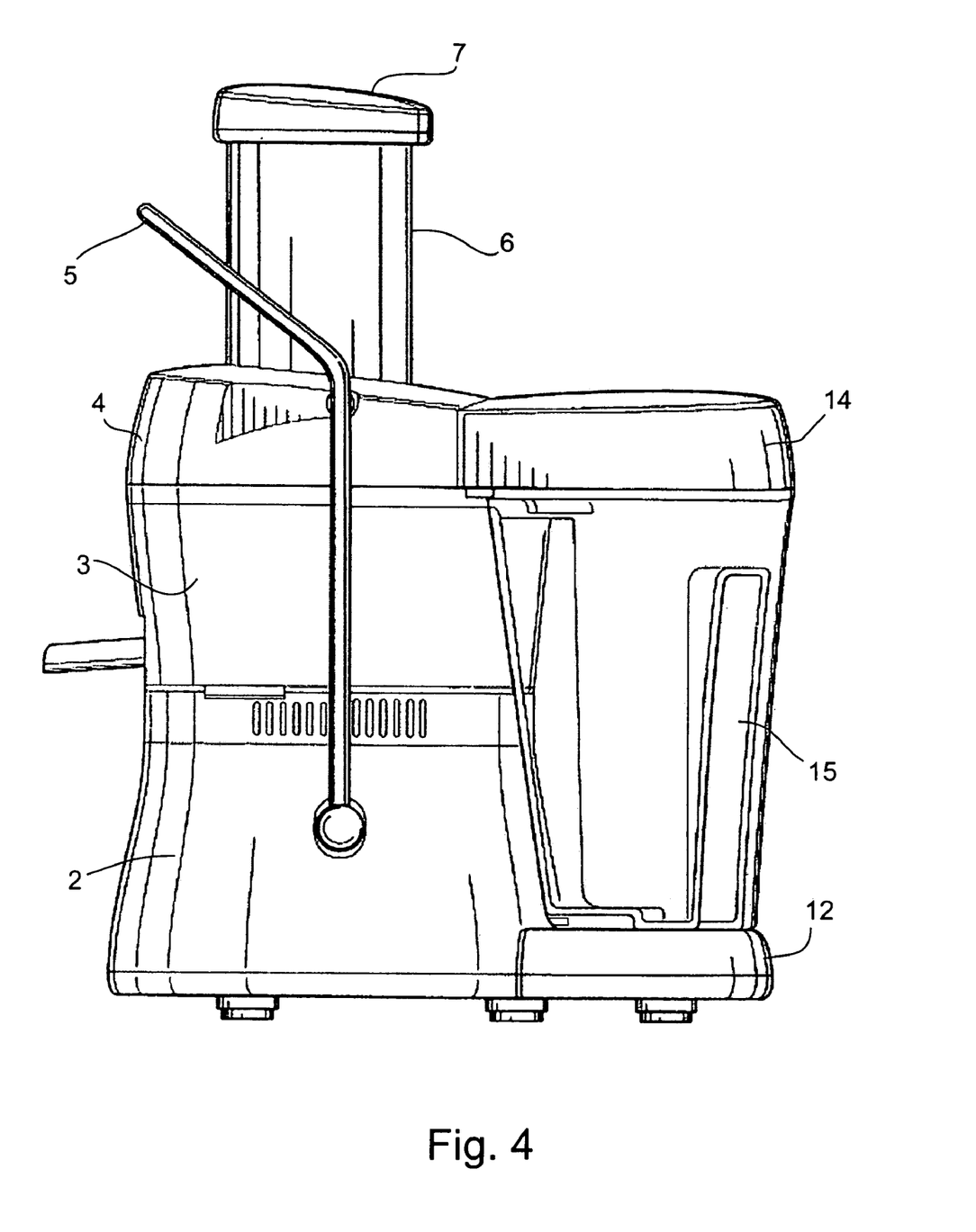
Figure 5:
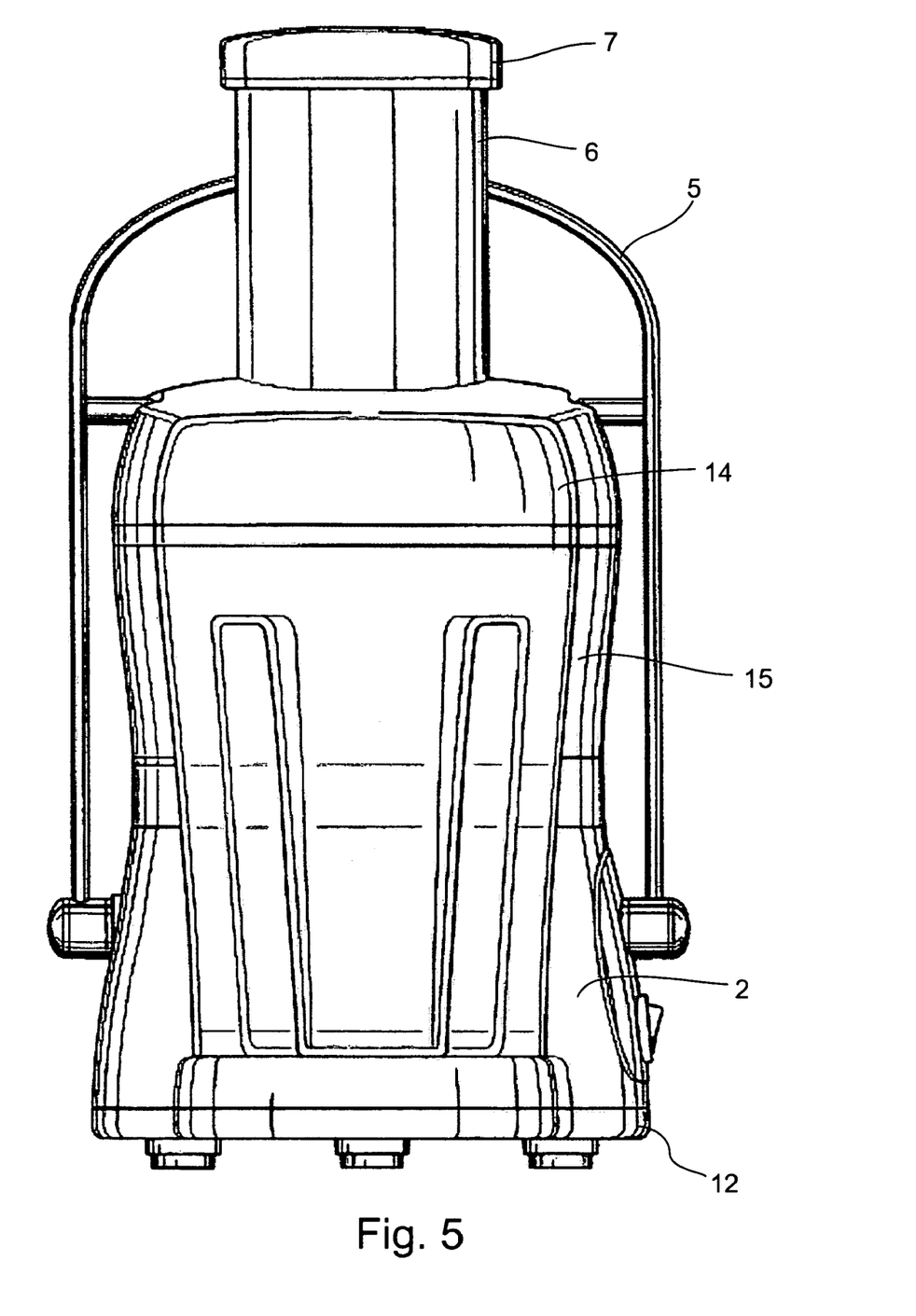
FIG. 5 is a rear elevational view of the appliance of FIG. 1.

FIG. 2 illustrates another improvement in the illustrated juice extractor appliance. Thus, as shown in FIG. 2, the lateral extension 12 of the appliance base 2, for receiving the container 15 for the pulp separated by screen 9, includes a platform 130 on which the receptacle 15 is placed, and a sensor, in the form of a microswitch 131, which is actuated when the receptacle is placed on the platform. Microswitch 131 senses the presence of a receptacle 15 on platform 130 and is effective to enable the operation of the electrical motor M for operating the appliance. Thus, if no receptacle is sensed in its proper position on platform 130, the appliance will be disabled from operation.

Figure 13:
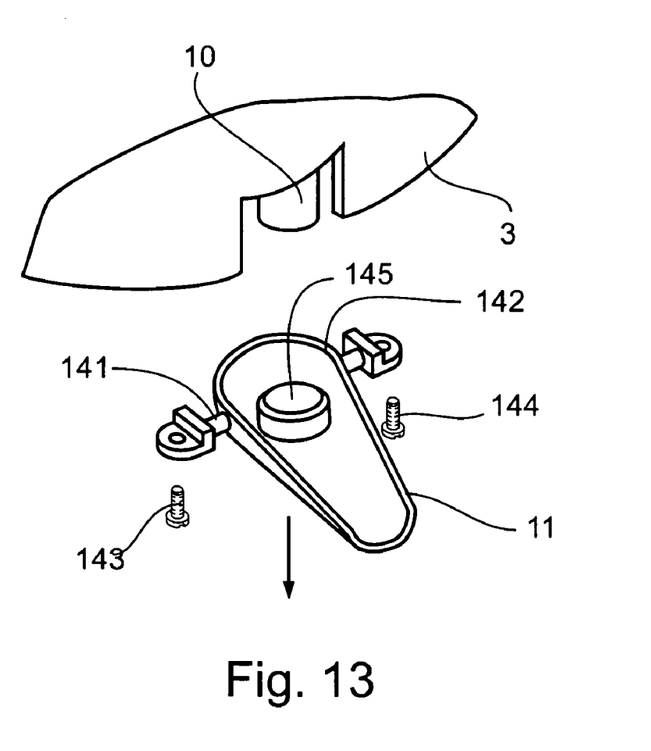
FIG. 13 is an exploded perspective view illustrating the construction of the juice outlet.
Figure 14:
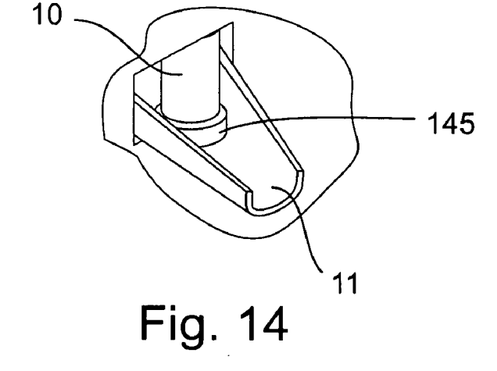
FIG. 14 is a perspective view illustrating the normally-closed position of the juice outlet blocking the flow of juice therefrom.
Figure 15:
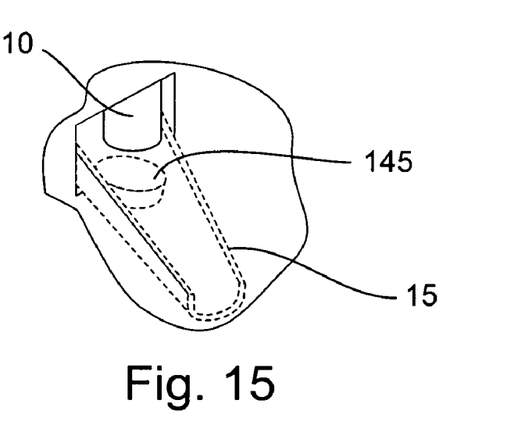
FIG. 15 is a corresponding view but showing, in broken lines, the open position of the juice outlet permitting the flow of juice therefrom.

A further improvement in the illustrated appliance is seen in FIGS. 13–15 which illustrate the juice outlet of the appliance for outletting juice extracted from the food articles. Thus, as shown in FIG. 13, the outlet includes the spout 11 underlying the juice outlet tube 10, briefly described above. In this case, however, the spout 11 is pivotally mounted to housing section 3 by a pair of pins 141, 142, each of which is fixed by a fastener 143, 144 to housing section 3 under the juice outlet tube 10. The inner end of spout 11 carries an elastomeric cap or plug 145, in alignment with the juice outlet tube 10.

Spout 11 is pivotal either to a blocking position, shown in full lines in FIG. 14, wherein cap 145 engages the end of the juice outlet tube 10 to block the flow of juice therefrom, or to an unblocking position shown in broken lines in FIG. 15, to unblock the flow of juice from outlet tube 10. Thus, when the appliance is not being operated, spout 11 would be in its upper blocking position illustrated in FIG. 14, and when the appliance is to be used for extracting juice from food articles, the spout would be pivoted to its lower unblocking position illustrated in FIG. 15.

It will also be seen from FIG. 13, that spout 11 may easily be removed from the appliance for cleaning, repair or replacement purposes.

While the invention has been described with respect to one preferred embodiment, it will be appreciated that this is set forth merely for purposes of example, and that many other variations, modifications and applications of the invention may be made.

What is claimed is:

1. A food processor appliance for processing food articles, comprising:
   a housing having an inlet feed tube for feeding food articles into the appliance;
   a pusher rod for manually pushing the food articles through said inlet feed tube; and
   a cutter disc rotatable about a central disc axis and including a plurality of cutting edges for cutting the food articles into pieces when the food article is pushed against said cutter disc by said pusher rod;
   said cutter disc including, on the side thereof facing said inlet feed tube, a projecting pinching surface projecting outwardly of said cutting edges and located eccentrically with respect to said central disc axis such that when only a thin sliver of food article remains between said pusher rod and cutter disc, said projecting pinching surface presses the thin sliver against said pusher rod to effect a slight rotation of said thin sliver with respect to said cutter disc, and thereby to better assure the complete cutting up of the food article fed into said inlet feed tube.

2. The appliance according to claim 1, wherein said projecting pinching surface is in the form of a dimple formed in the side of the cutter disc opposite to that facing said inlet feed tube at said eccentric location such as to produce said projecting pinching surface on the side of the cutter disc facing said inlet feed tube.

3. The appliance according to claim 1, wherein said projecting pinching surface is in the form of a projection formed in the side of said cutter disc facing said inlet feed tube at said eccentric location.

4. The appliance according to claim 1, wherein said cutter disc includes a plurality of said projecting pinching surfaces located eccentrically with respect to said central disc axis.

5. The appliance according to claim 1, wherein said plurality of cutting edges include a first group of cutting edged located in a central circular region of the cutter disc, and a second group of cutting edges located in an outer peripheral region of the cutter disc around said central circular region;
   said projecting pinching surface being located in said central circular region eccentrically with respect to said central disc axis.

6. The appliance according to claim 5, wherein said central disc axis of the cutter disc is displaced laterally with respect to the axis of said inlet feed tube.

7. The appliance according to claim 5, wherein said second group of cutting edges are located in a plurality of lines radiating from said central circular region.

8. The appliance according to claim 7, wherein said first group of cutting edges are in the form of extensions of at least two of said lines of cutting edges of said second group and of substantially the same size as those of said second group.

9. The appliance according to claim 7, wherein said first group of cutting edges are of larger size than those of the said second group.

10. The appliance according to claim 1, wherein the appliance is for extracting juice from said food articles; and wherein the appliance further comprises:
   an outlet for outletting juice extracted from said food articles; and
   a separator within said housing for separating the juice from the pulp and for directing the juice via an outlet tube to said outlet.

11. The appliance according to claim 10, wherein said outlet includes a spout movably mounted with respect to said outlet tube to a non-blocking position permitting the flow of juice to said spout, or to a blocking position blocking the flow of juice to said spout.

12. The appliance according to claim 11, wherein said spout is pivotably mounted and includes a blocking element at one end engageable with said outlet tube in the blocking position of the spout, and disengageable from said outlet tube in the non-blocking position of the spout.

13. The appliance according to claim 12, wherein said blocking element is an elastomeric cap engageable with, and disengageable from, the end of said outlet tube.

14. The appliance according to claim 10, wherein said appliance further comprises:
   a lateral extension extending laterally of said housing for receiving a receptacle to collect the pulp after the juice has been separated therefrom;
   said lateral extension including a sensor for sensing a receptacle thereon and effective to enable rotation of the cutter disc when a receptacle is sensed on said lateral extension.

15. The appliance according to claim 14, wherein said sensor is a microswitch controlling a drive for said cutter disc.

16. A juice extractor appliance for extracting juice from food articles, comprising:
   a housing having an inlet feed tube for feeding food articles into the appliance, and an outlet for outletting juice extract from such food articles;
   a pusher rod for manually pushing the food articles through said inlet feed tube;
   a cutter disc rotatable about a central disc axis and including a plurality of cutting edges projecting from one side of the disc facing said inlet feed tube for cutting the food articles into a pulp saturated with juice when the food article is pushed against said cutter disc by said pusher rod;
   and a separator within said housing for separating the juice from the pulp and for directing the juice via a feed tube to said outlet;
   said outlet including a spout movably mounted with respect to an outlet tube to a non-blocking position permitting the flow of juice to said spout, or to a blocking position blocking the flow of juice to said spout;
   said spout being pivotably mounted and including a blocking element at one end engageable with said outlet tube in the blocking position of the spout, and disengageable from said outlet tube in the non-blocking position of the spout.

17. The juice extractor appliance according to claim 16, wherein said blocking element is an elastomeric cap engageable with, and disengageable from, the end of said outlet tube.

18. A juice extractor appliance for extracting juice from food articles, comprising:
   a housing having an inlet feed tube for feeding food articles into the appliance, and an outlet for outletting juice extract from such food articles;
   a pusher rod for manually pushing the food articles through said inlet feed tube;
   a cutter disc rotatable about a central disc axis and including a plurality of cutting edges projecting from one side of the disc facing said inlet feed tube for cutting the food articles into a pulp saturated with juice when the food article is pushed against said cutter disc by said pusher rod;
   a separator within said housing for separating the juice from the pulp and for directing the juice via a feed tube to said outlet; and
   a lateral extension extending laterally of said housing for receiving a receptacle to collect the pulp after the juice has been separated therefrom;
   said lateral extension including a sensor for sensing a receptacle thereon and effective to enable rotation of the cutter disc when a receptacle is sensed on said lateral extension.

19. The juice extractor appliance according to claim 18, wherein said sensor is a microswitch controlling a drive for said cutter disc.

* * * * *